A. J. RICE.
PASTEURIZING APPARATUS.
APPLICATION FILED APR. 23, 1913.

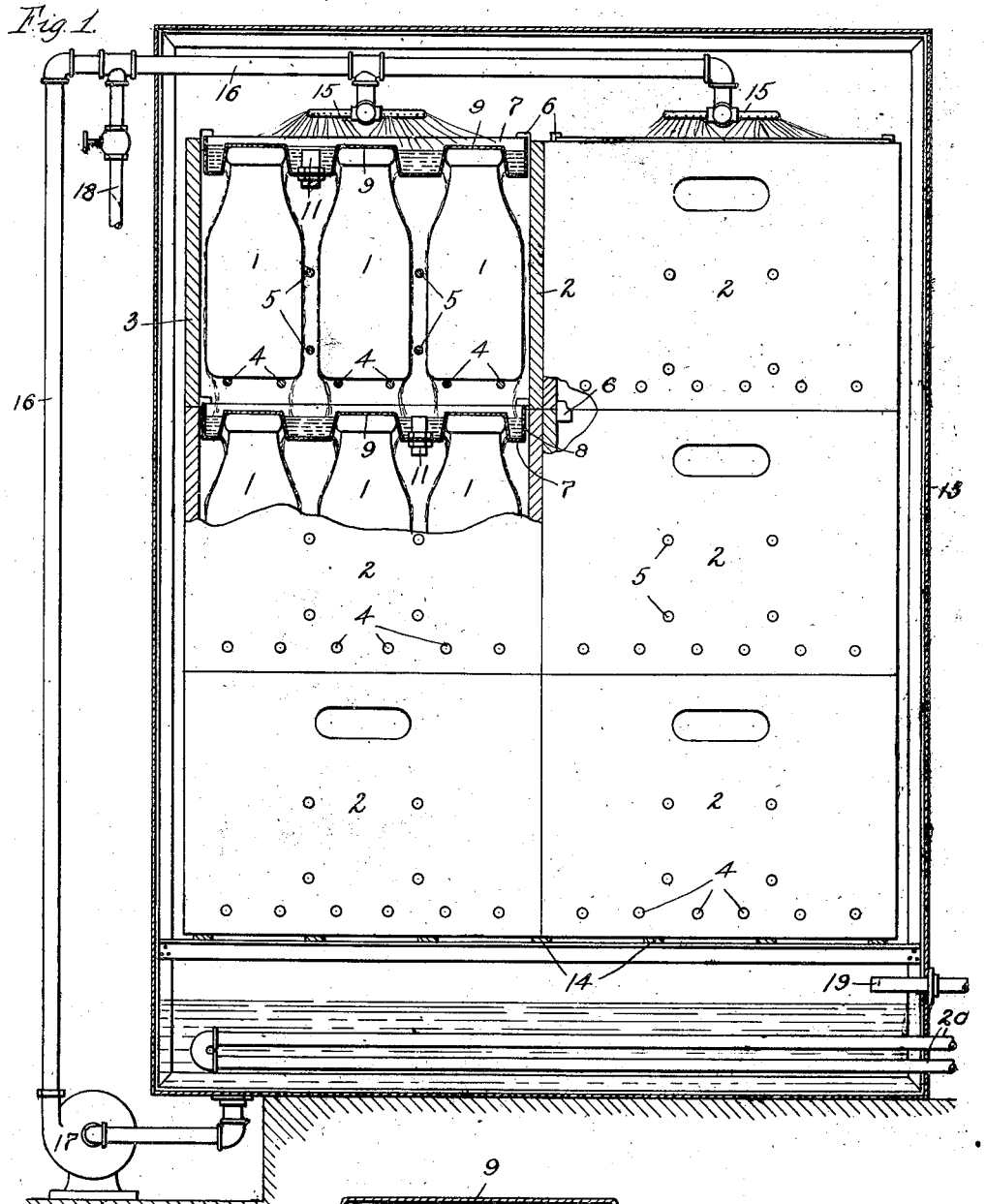

1,186,944.

Patented June 13, 1916.
3 SHEETS—SHEET 2.

Witnesses:—
A. Bakewhagen
E. H. Massack

Inventor
Albert J. Rice
By Wilhelm, Parker, Stein
Attorneys.

A. J. RICE.
PASTEURIZING APPARATUS.
APPLICATION FILED APR. 23, 1913.
1,186,944.
Patented June 13, 1916.
3 SHEETS—SHEET 3.
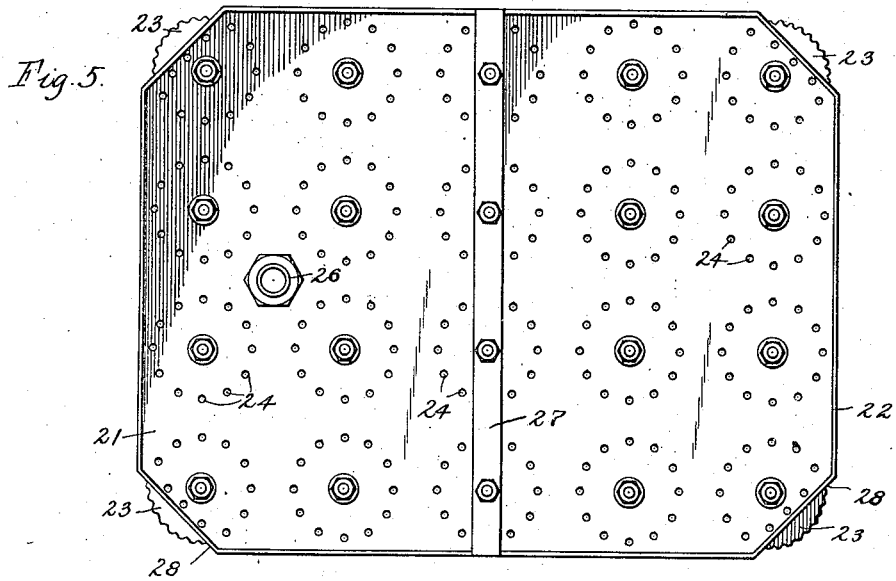
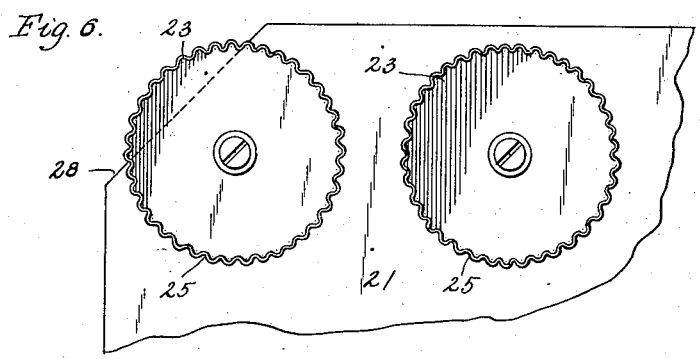
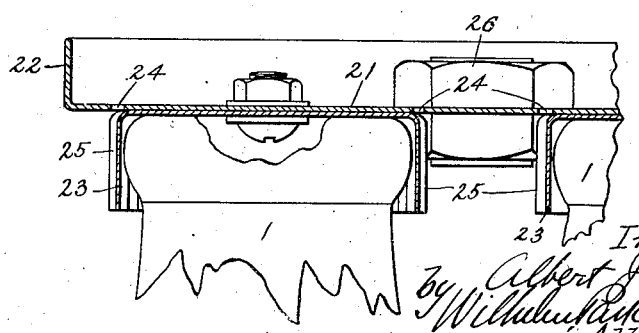
Witnesses:—
A. Borkenhagen.
C. H. Massack.
Inventor
Albert J. Rice
by Wilhelm, Parker & Hare
Attorneys.

UNITED STATES PATENT OFFICE.

ALBERT J. RICE, OF BUFFALO, NEW YORK, ASSIGNOR TO RICE & ADAMS, OF BUFFALO, NEW YORK, A PARTNERSHIP.

PASTEURIZING APPARATUS.

1,186,944. Specification of Letters Patent. Patented June 13, 1916.

Application filed April 23, 1913. Serial No. 763,061.

*To all whom it may concern:*

Be it known that I, ALBERT J. RICE, a citizen of the United States, residing at Buffalo, in the county of Erie and State of New York, have invented a new and useful Improvement in Pasteurizing Apparatus, of which the following is a specification.

This invention relates to apparatus for pasteurizing substances in bottles or jars or like containers and is particularly applicable to the pasteurization of bottled milk and cream.

In accordance with this invention it is possible to treat at one time a large number of bottles which may be stacked up in crates, or otherwise, and which need not be sealed. The apparatus is especially suited for treating the bottles while in place in the ordinary shipping crates and affords a practical and efficient pasteurizing means for the use of small dealers.

The invention provides means for assuring a proper distribution of the pasteurizing medium over all of the bottles and also protects the tops of the bottles so as to prevent the contamination of the substance in the bottles if the latter are not tightly sealed. The protection of the tops of the bottles in this manner makes it possible to pasteurize milk in ordinary milk bottles covered with the usual pasteboard disks, or even while uncovered, a practice which has heretofore been impracticable.

Figure 3:
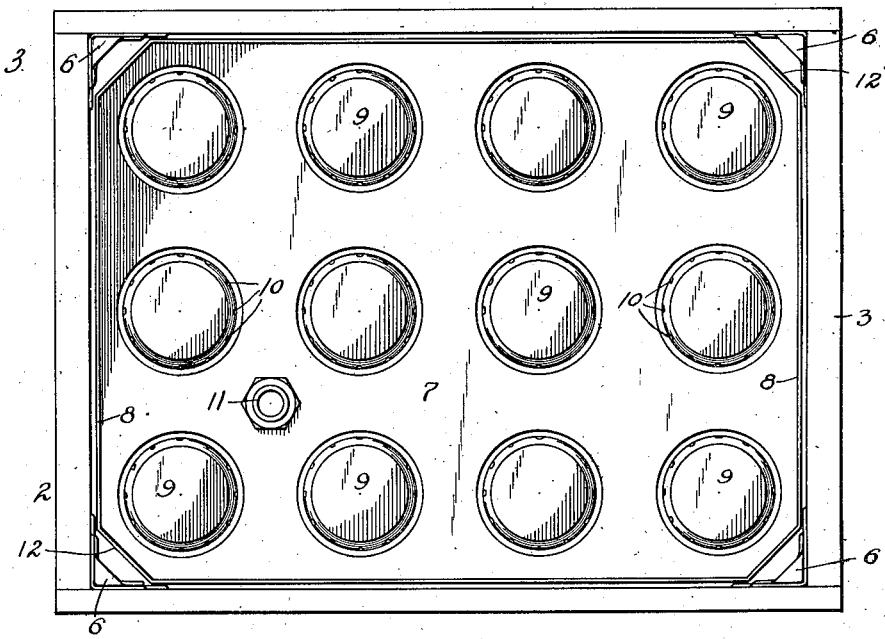
Figure 4:
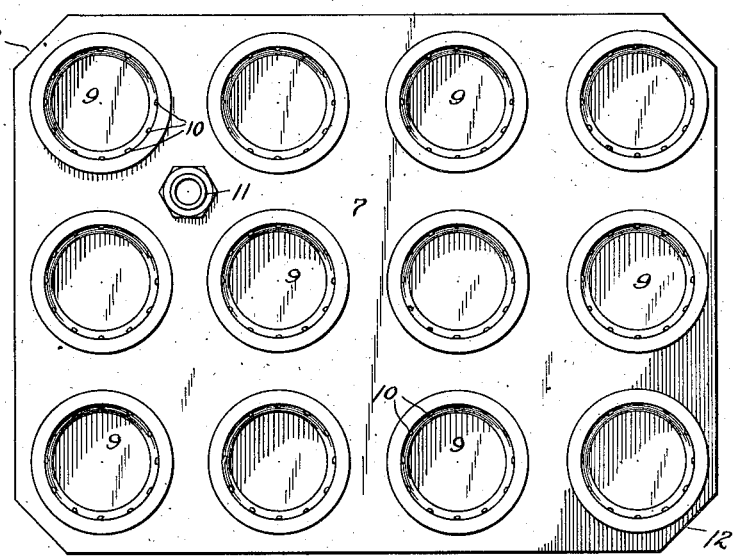

In the accompanying drawings: Figure 1 is a vertical section of a cabinet having a number of crates of milk bottles stacked therein, illustrating one embodiment of the invention. Fig. 2 is a fragmentary vertical section, on an enlarged scale, of a portion of one of the distributing troughs, showing the top of a milk bottle in elevation. Fig. 3 is a top plan view of a milk bottle crate with a distributing trough covering the tops of the bottles therein. Fig. 4 is a bottom plan view of the distributing trough. Fig. 5 is a top plan view of a modified form of distributing trough. Fig. 6 is a fragmentary bottom plan view of the trough shown in Fig. 5, on an enlarged scale. Fig. 7 is a fragmentary vertical sectional view, on an enlarged scale, of a portion of the trough shown in Figs. 5 and 6 and showing the top of a milk bottle.

Referring to Figs. 1 to 4, 1 designates the bottles of milk or other substance to be pasteurized. These are stacked up in any suitable manner, preferably by being placed in crates 2, such as are commonly used for shipping bottled milk. A well known form of these crates is illustrated in the drawings and comprises a box or frame 3, without top or bottom, having transverse wires or rods 4 passing across the same upon which the bottles rest and other transverse wires 5 which divide the crate into individual compartments for the bottles. These crates are all made of the same size so that they may be stacked one upon the other and are preferably provided with corner irons 6 projecting slightly above the upper edges thereof so that the corner irons of one crate are adapted to fit into the bottom of the crate above and so hold the crates in a stack in vertical alinement. The crates may obviously be of any other suitable construction. The milk or other contents of the bottles is heated to the pasteurizing temperature by causing hot water to flow over the bottles and is then lowered again to the proper temperature by similarly causing cold water to flow over the bottles. In order to insure a proper distribution of this water and to prevent the same from entering the tops of the bottles, shallow distributing vessels or troughs 7 are provided. These troughs are placed one in the top of each crate and each is provided with a marginal flange 8 and with a plurality of inverted cup-shaped pockets or caps 9 arranged to fit over the tops of the bottles in the crates. The water is fed into the trough 7 and is distributed uniformly over the surfaces of the bottles through a plurality of perforations 10 formed around the caps 9. It will be seen that the caps effectually prevent the entrance of the heating or cooling water into the tops of the bottles so that the latter need not be tightly sealed, or in fact covered at all except by the caps themselves. As a matter of practice, however, the bottles when containing milk or cream are usually closed with the customary paste-board disks. Each trough is preferably provided with an overflow tube 11, the open upper end of which is above the perforations 10 and below the edge of the marginal flange 8. One of the distributing troughs is preferably placed in the top of each crate, the corners of the trough being cut away if necessary, as indicated at 12, so as to clear the corner irons 6. The troughs rest directly on the bottles so that no special supporting devices therefor are required. The heating or cooling water is fed into the trough at the top of the stack, runs through the holes 10 around each of the caps and flows over the surface of each bottle in a uniform film. From the bottoms of the bottles the water drips into the trough below which again distributes it uniformly over the bottles in the second crate and so flows on down through the entire stack. If water is fed into any trough faster than it can escape through the perforations 10, it will rise in the trough to the level of the overflow opening and overflow into the trough below through the tube 11. The overflow devices 11 prevent the heating or cooling fluid from overflowing over the marginal walls of the distributing troughs, thereby insuring that the liquid discharging from one trough will be caught and properly distributed by the next trough. This construction also enables the water to be maintained at a substantially constant level in the trough, thus insuring a sufficient head or pressure to cause the water to discharge properly against the bottles.

The use of the troughs associated with each tier of bottles makes absolutely certain the even distribution of the heating or cooling fluid over each bottle, and the heating or cooling fluid will not follow isolated streams or tracks on the bottles as frequently happens where no distributing means are provided for directing the fluid from the bottles in one tier onto the bottles in the next tier. The adequate treatment of the contents of each bottle is thus assured, the heating and cooling fluids are economically used and the danger of breakage of the bottles by heating them unevenly is avoided.

The tiers of bottles and distributing troughs may be stacked up in any suitable place and supplied with any heating or cooling fluid in any suitable manner. Fig. 1, however, shows a convenient construction for this purpose. As here shown, a number of crates of bottles, each provided with its distributing troughs, are stacked in a cabinet 13 which has a false floor or grating 14 upon which the crates rest. Water is supplied at the top of the stack through suitable distributing heads 15 fed from a pipe 16. The water runs down over the tiers of bottles and collects in the bottom of the cabinet, which forms a storage tank. A circulating pump 17 draws the water from the bottom of the cabinet and forces it up through the pipe 16 to the distributing heads 15.

18 is a steam connection by which steam may be injected into the water flowing through the pipe 16 so as to heat the same.

19 is a pipe by which cold water may be supplied to the storage tank in the bottom of the cabinet in order to lower the temperature of the circulated water. When it is desired further to cool the water in the bottom of the cabinet, ice may be added to it or, as shown, a refrigerating pipe 20 may be placed in it through which brine may be circulated when desired.

The operation of pasteurizing with this apparatus is as follows: The crates of bottles of milk or other substance are stacked in the cabinet and the circulating pump 17 is started. Steam is then injected into the pipe 16, thus gradually raising the temperature of the water being supplied to the distributing troughs. The temperature of the bottles is thus gradually raised so that the bottles are not cracked. The water being circulated over and over again gets hotter and hotter as more steam is injected into it and eventually the bottles and their contents are raised to the desired temperature for the destruction of the bacilli, which temperature, in the case of milk, is in the neighborhood of 140° F. When this temperature is reached, if the cabinet is reasonably tight and of material which does not permit of too rapid radiation of heat, the pump 17 may be stopped and the bottles permitted to stand in the cabinet for a suitable length of time, for instance about half an hour, while the pasteurizing process is completed. Sufficient heat is retained by the cabinet to prevent the temperature of the bottles from falling below the pasteurizing temperature during this period. In case, however, it is found that the heat escapes too rapidly by radiation, its loss may be made up by continuing the operation of the pump 17 and circulating a small amount of hot water through the apparatus or by almost cutting off the steam supply so as to prevent the further rise in the temperature of the circulated water. After the pasteurizing temperature has been maintained for the necessary period, the bottles and their contents are cooled to a low temperature for storage or transportaion. The cooling is accomplished by gradually reducing the temperature of the circulated water first by adding cold water thereto from the pipe 19 and finally by placing ice in the bottom of the cabinet, or by circulating refrigerated brine through the pipe 20. The temperature of the circulated water is preferably reduced gradually, just as it was raised gradually, so as to prevent the cracking of the bottles from sudden changes in temperature.

Figs. 5, 6, and 7 show a modified form of distributing trough consisting of a trough or pan proper 21, having a marginal flange 22, and having secured to its under surface in any suitable manner a plurality of bottle caps or covers 23. The water passes through perforations 24 in the bottom of the trough around each of the caps, the side walls of the latter being preferably corrugated as indicated at 25, to insure a proper distribution of the water and prevent the same from collecting and running down the bottles in comparatively large streams or rivulets instead of being uniformly distributed over the bottle surface. Each trough is preferably provided with an overflow tube 26 and, if necessary, may be stiffened by means of a brace 27. The corners of the trough are preferably cut off, as indicated at 28, to clear the corner irons of the crates. This modification of the invention is particularly adapted to use with small bottles, such as the ordinary pint milk bottles, which stand well into the corners of the crates. In order to cover such corner bottles, the corner caps 23 may be caused to project beyond the cutoff corners 28 of the trough as shown in Figs. 5 and 6. With larger bottles, such as quart bottles of milk, the form of trough shown in Figs. 1 to 4 is preferred as it is more readily constructed. The operation of the two forms is essentially the same.

I claim as my invention:

1. In an apparatus for altering the temperature of the contents of containers, a trough for distributing a temperature changing liquid over the containers, the said trough having parts above the containers for preventing the liquid from flowing on to the tops of the containers, liquid discharge openings surrounding said parts, walls for confining the liquid in the trough, and a liquid overflow located above the liquid distributing openings and below the top of said confining walls, whereby a substantially constant head of liquid is maintained in the trough.

2. In bottle pasteurizing apparatus, the combination of a plurality of bottle crates adapted to contain bottles, stacked one upon the other, and a distributing trough supported over the tops of the bottles in each crate, each trough having a marginal wall, a plurality of caps for covering the bottles, perforations surrounding the caps, and an overflow orifice above said perforations and below the top of said marginal wall.

3. In bottle pasteurizing apparatus, the combination of a cabinet, means for supporting bottles therein in tiers one above the other, a distributing trough located above the bottles in each tier, each trough including means for covering the tops of the bottles in the tier below, and means for distributing liquid supplied to the trough over the bottles, the bottom of said cabinet forming a collecting receptacle, and means for drawing liquid from the bottom of said cabinet and conveying the same to the distributing trough over the upper tier of bottles in the cabinet.

4. In bottle pasteurizing apparatus, the combination of a cabinet, means for supporting bottles therein in tiers one above the other, a distributing trough located above the bottles in each tier, each trough including means for covering the tops of the bottles in the tier below, and means for distributing liquid supplied to the trough over the bottles, the bottom of said cabinet forming a collecting receptacle, means for drawing liquid from the bottom of said cabinet and conveying the same to the distributing trough over the upper tier of bottles in the cabinet, and means for changing the temperature of said circulated liquid.

5. In an apparatus for pasteurizing substances while in containers, a liquid distributer comprising a trough having a marginal wall and inverted cup-shaped caps projecting upwardly from the bottom of the trough, perforations being formed around the base of each cap, and an overflow orifice above said perforations and below the top of said marginal wall.

Witness my hand, this 18th day of April, 1913.

ALBERT J. RICE.

Witnesses:
C. W. PARKER,
C. B. HORNBECK.